United States Patent [19]

Kitsunai et al.

[11] Patent Number: 4,591,619
[45] Date of Patent: May 27, 1986

[54] PROCESS FOR PRODUCING AN IMINATED COPOLYMER

[75] Inventors: Tomoyuki Kitsunai; Kiyotaka Saito, both of Machida; Shozo Hori, Ayase, all of Japan

[73] Assignee: Denki Kagaku Kogyo Kabushiki Kaisha, Tokyo, Japan

[21] Appl. No.: 684,552

[22] Filed: Dec. 21, 1984

Related U.S. Application Data

[62] Division of Ser. No. 385,203, Jun. 4, 1982, Pat. No. 4,504,625.

[30] Foreign Application Priority Data

Dec. 11, 1981 [JP] Japan .................................. 56-199720
Apr. 23, 1982 [JP] Japan .................................. 57-68174

[51] Int. Cl.$^4$ ........................ C08L 21/00; C08L 51/04
[52] U.S. Cl. .................................... 525/285; 525/378; 525/379
[58] Field of Search ...................... 525/285, 378, 379

[56] References Cited

U.S. PATENT DOCUMENTS

| | | | |
|---|---|---|---|
| 3,642,949 | 2/1972 | Stafford et al. | 525/74 |
| 3,651,171 | 3/1972 | von Bonin et al. | 525/73 |
| 3,652,726 | 3/1972 | Wield et al. | 525/73 |
| 4,122,130 | 10/1978 | Fava | 525/74 |
| 4,144,287 | 3/1979 | Kudo et al. | 525/71 |
| 4,224,419 | 9/1980 | Swoboda et al. | 525/71 |
| 4,335,037 | 6/1982 | Lordi et al. | 525/71 |
| 4,381,373 | 4/1983 | Ikuma | 525/71 |

*Primary Examiner*—Allan M. Lieberman
*Attorney, Agent, or Firm*—Jordan and Hamburg

[57] ABSTRACT

A thermoplastic resin composition is provided which comprises 10 to 90 wt % of an iminated copolymer prepared by reacting ammonia and/or a primary amine with a graft copolymerization product obtained by graft-copolymerizing a rubber-like polymer with a monomer mixture containing an aromatic vinyl monomer and an unsaturated dicarboxylic acid anhydride and 10 to 90 wt % of a graft-copolymer obtained by graft-copolymerizing a rubber-like polymer with a monomer mixture containing an aromatic vinyl monomer and/or a polymer obtained by polymerizing an aromatic vinyl monomer.

12 Claims, 1 Drawing Figure

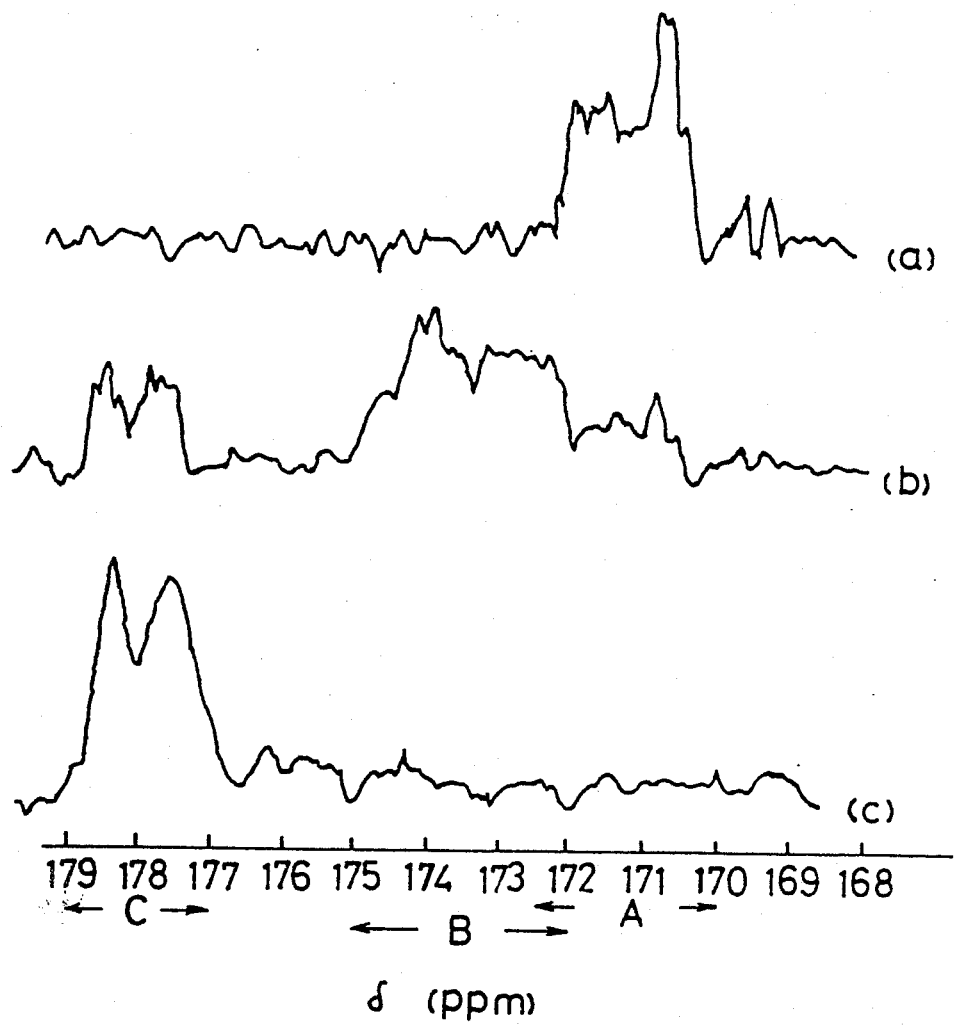

PROCESS FOR PRODUCING AN IMINATED COPOLYMER

This is a division of application Ser. No. 385,203, filed June 4, 1982 now U.S. Pat. No. 4,504,625.

BACKGROUND OF THE INVENTION

1. Field of the Invention

The present invention relates to a thermoplastic resin composition, and more particularly to a thermoplastic resin composition containing an iminated copolymer.

2. Prior Art

A copolymer prepared by graft-copolymerizing a rubber-like polymer with a mixture including an aromatic vinyl monomer, an unsaturated dicarboxylic acid anhydride and other monomers, and a blend composition including said copolymer blended with a rubber-modified copolymer have hitherto been known by Unexamined Japanese Patent Publication Nos. 42091/1973 and 96555/1979. Although these known copolymers prepared by copolymerizing unsaturated dicarboxylic acid anhydrides have high heat distortion temperatures, they tend to decompose due to chemical reactions in the presence of water at high temperature or only by subjecting to high temperature since they have acid anhydride residues in the copolymer chains derived from the unsaturated dicarboxylic acid anhydrides. For this reason, in addition to the strict limitation imposed on the injection or extrusion molding operations, the mechanical properties, particularly the impact strength, are deteriorated when the molded products are contacted with water or steam or exposed to high temperature.

U.S. Pat. No. 3,642,949 discloses a composition comprising a so-called ABS resin blended with a copolymer of an aromatic vinyl monomer and an unsaturated dicarboxylic acid anhydride or an imide thereof. However, the product made of such a composition blended with an unsaturated dicarboxylic acid anhydride or an imide derived from an unsaturated dicarboxylic acid has unsatisfactorily low impact strength.

OBJECTS AND SUMMARY OF THE INVENTION

A primary object of this invention is to provide a thermoplastic resin composition having excellent thermal stability.

Another object of this invention is to provide a thermoplastic resin composition, the mechanical properties of which are not deteriorated when exposed to high temperature environment.

A further object of this invention is to provide a thermoplastic resin composition having a high impact strength, a high heat distortion temperature and improved in resistance to hot water.

A still further object of this invention is to provide a thermoplastic resin composition which is chemically stable even when exposed to water or high temperature.

Yet a further object of this invention is to provide a thermoplastic resin composition which is improved in moldability.

The above and other objects of this invention will become apparent from the following description.

A thermoplastic resin composition according to this invention comprises 10 to 90 wt % of an iminated copolymer (Component A) prepared by reacting one selected from the group consisting of ammonia and a primary amine with a graft copolymerization product obtained by graft-copolymerizing 3 to 40 wt % of a rubber-like polymer with 60 to 97 wt % of a monomer mixture consisting essentially of 50 to 95 wt % of an aromatic vinyl monomer, 5 to 50 wt % of an unsaturated dicarboxylic acid anhydride and 0 to 30 wt % of a vinyl monomer copolymerizable with said aromatic vinyl monomer and said unsaturated dicarboxylic acid anhydride, and 10 to 90 wt % of a graft-copolymer (Component B) obtained by graft-copolymerizing 3 to 80 wt % of a rubber-like polymer with 20 to 97 wt % of a monomer mixture consisting essentially of 40 to 100 wt % of an aromatic vinyl monomer, 0 to 40 wt % of a cyanated vinyl monomer and 0 to 40 wt % of a vinyl monomer copolymerizable with said aromatic vinyl monomer and said cyanated vinyl monomer, and/or a polymer (Component C) obtained by polymerizing 40 to 100 wt % of an aromatic vinyl monomer, 0 to 40 wt % of a cyanated vinyl monomer and 0 to 40 wt % of a vinyl monomer copolymerizable with said aromatic vinyl monomer and said cyanated vinyl monomer.

BRIEF DESCRIPTION OF THE DRAWING

The single drawing appended hereto is a graphic representation of C-13 NMR spectra in the carbonyl region of the polymers, wherein the curve a shows the spectrum of Comparative Example 1, curve b shows the spectrum of Comparative Example 2 and curve c shows the spectrum of Example 1.

DESCRIPTION OF THE INVENTION

A thermoplastic resin composition according to this invention comprises the aforementioned Component A and the Components B and/or C.

Initially, the Component A will be described hereunder. The Component A, i.e. the iminated copolymer is prepared by reacting one selected from the group consisting of ammonia and primary amines with a graft copolymerization product obtained by graft-copolymerizing 3 to 40 wt % of a rubber-like polymer with 60 to 97 wt % of a monomer mixture consisting essentially of 50 to 95 wt % of an aromatic vinyl monomer, 5 to 50 wt % of an unsaturated dicarboxylic acid anhydride and 0 to 30 wt % of a vinyl monomer copolymerizable with said aromatic vinyl monomer and said unsaturated dicarboxylic acid anhydride.

The content of the rubber-like polymer should be selected within the range of from 3 to 40 wt %, preferably 5 to 30 wt %, based on the weight of the copolymer before imination and the monomer mixture should be selected within the range of from 60 to 97 wt %, preferably 70 to 95 wt % based on the weight of the copolymer before imination, depending on the impact strength required for the final product thermoplastic polymer. The impact strength of the final product is improved as the content of the rubber-like polymer is increased. However, the moldability of the final product thermoplastic polymer is deteriorated if the content of the rubber-like polymer exceeds 40 wt %. On the contrary, if the content of the rubber-like polymer is less than 3 wt %, the impact strength is not improved to a satisfactory level.

In order to improve the heat resistant property of the copolymer while retaining the mechanical strengths and the moldability thereof at high level, it is essential that 50 to 95 wt % of an aromatic vinyl monomer be copolymerized with 5 to 50 wt %, preferably 10 to 50 wt % of an unsaturated dicarboxylic acid anhydride and 0 to 30 wt %, preferably 0 to 10 wt % of another vinyl monomer copolymerizable with the aromatic vinyl monomer and the unsaturated dicarboxylic acid anhydride. In the present invention, it is desired that the composition of the resultant copolymer be uniform and approximate to the composition of the used monomer composition. A copolymer having a uniform composition distribution may be prepared by subjecting the monomer composition to a radical copolymerization while adding an unsaturated dicarboxylic acid anhydride at a rate substantially lower than the polymerization rate of the mixture of an aromatic vinyl monomer, the unsaturated dicarboxylic acid anhydride and a copolymerizable monomer. The radical polymerization initiator may be added to the monomer mixture collectively at the initiation of the reaction or may be dividedly added together with the unsaturated dicarboxylic acid anhydride. If the content of the aromatic vinyl monomer is less than 50 wt %, the advantageous properties provided by the aromatic vinyl compound, particularly in case of styrene, such as excellent moldability and the dimensional stability, are not realized. If the content of unsaturated dicarboxylic acid anhydride is less than 5 wt %, the heat resistant property is not improved. On the contrary, if the content of unsaturated dicarboxylic acid anhydride is more than 50 wt %, the resultant copolymer becomes fragile and the moldability thereof is extremely deteriorated.

The rubber-like polymer may be dissolved in any of the monomers, such as the used aromatic vinyl monomer, or may be diluted by the addition of an organic solvent, as desired.

It is desirous that the content of gel in the rubber-like polymer used in the Component A should be not more than 5% by weight, and that the glass transition temperature thereof should be below — (minus) 20° C. Specific examples of the rubber-like polymer include polymers of butadiene, isoprene and chloroprene; rubber-like copolymers or block copolymers of diene monomers including the aforementioned butadiene, isoprene and chloroprene with another vinyl monomer, such as styrene, acrylonitrile, acrylic esters or methacrylic esters; rubber-like copolymers of ethylene/propylene/diene system; acrylic ester base polymer rubbers including homopolymers or copolymers of ethyl acrylate, butyl acrylate, 2-ethylhexyl acrylate and 2-chloroethyl acrylate, and copolymers thereof with a copolymerizable monomer, such as acrylonitrile, styrene, butadiene or methyl methacrylate. Most preferred examples of the rubber-like polymer include a diene rubber such as polybutadiene, styrene/butadiene random copolymer, styrene/butadiene block copolymer and acrylonitrile/butadiene copolymer; and a polymer of butyl acrylate.

The aromatic vinyl monomer used as the starting material for the iminated copolymer modified with a rubber, includes styrene monomers or substituted styrene monomers, such as styrene, α-methylstyrene, vinyltoluene, t-butylstyrene and chlorostyrene, the particularly preferred are styrene and α-methylstyrene.

Examples of the unsaturated dicarboxylic acid anhydride include anhydrides of maleic acid, itaconic acid, citraconic acid and aconitic acid, the particularly preferred is maleic acid anhydride. The copolymerizable vinyl monomers used in the Component A include cyanated vinyl monomers, such as acrylonitrile, methacrylonitrile and α-chloroacrylonitrile; acrylic ester monomers, such as methylacrylic esters, ethylacrylic esters and butylacrylic esters; methacrylic esters such as methylmethacrylic esters and ethylmethacrylic esters; vinylcarboxylic acid monomers, such as acrylic acid and methacrylic acid; acrylic amides; methacrylic amides, acenaphtylene, and N-vinyl carbazole. Amongst the aforementioned copolymerizable vinyl monomers, monomers of acrylonitrile, acrylic esters, methacrylic esters, methylmethaacrylic esters, acrylic acid and methacrylic acid are preferably used. Most preferred are acrylonitrile, methylmethacrylic esters and methacrylic acid.

Ammonia or primary amines may be used under anhydrous condition or in the form of aqueous solutions in the imination reaction in preparation of the Component A according to the present invention. Examples of the primary amines are alkylamines, such as methylamine, ethylamine, n-propylamine, iso-propylamine, butylamine, pentylamine and cyclohexylamine; alkylamines substituted by chlorine or bromine; aromatic amines, such as aniline, torylamine and naphtylamine; and aromatic amines substituted by halogens, such as chlorosubstituted or bromo-substituted anilines. Other examples of the usable primary amines are N-(2-acetoamido)2-aminoethanesulfonic acid, p-aminobenzoic acid, sodium p-aminobenzoate, sodium sulfamate, aminoacetic acid β-alanine, acrylamide, o-phosphoethanolamine, aminopropyltriethoxy-silane, 2,5-dichloroaniline-4-sulfonic soda, p-chloro-o-anisidine, α-chloroacetoamide, methacrylamide, 3-aminopropanol, 4-methoxy-2-methylaniline, diethylaminoethylamine, furfurylamine, allylamine and 3-amino-benzotrifluoride. Preferred examples include methylamine, butylamine and aniline. One of the aforementioned primary amines may be used singly or two or more of them may be used in combination.

Ammonia and/or the primary amine should be used in the molar ratio equivalent to or more than the molar equivalent of the unsaturated dicarboxylic acid anhydride contained in the rubber-like polymer/aromatic vinyl/unsaturated dicarboxylic acid anhydride copolymer, and preferably in the ratio of 1 to 1.3 times molar equivalent. The reaction between ammonia and/or primary amine with the rubber-like polymer/aromatic vinyl/unsaturated dicarboxylic acid anhydride copolymer may be effected in the presence or absence of a catalyst. If a catalyst is used, the preferred catalyst includes tertiary amines, such as trimethylamine, triethylamine, tripropylamine, tributylamine, N,N-dimethylaniline and N,N-diethylaniline, and a preferable amount thereof ranges 0.001 to 0.5 times the molar equivalent of the unsaturated dicarboxylic acid anhydride group in the copolymer.

It is not preferred that the percentage imination of the iminated copolymer is less than 90 mol %, because the stability or resistance to water and heat becomes unsatisfactory.

It is preferred that the imination reaction of the copolymer of rubber-like polymer/aromatic vinyl/unsaturated dicarboxylic acid anhydride should be carried out in an ordinary reaction vessel, such as an autoclave, when the copolymer is iminated in a solution or suspension in a non-aqueous medium. Otherwise, the copolymer may be iminated in a bulk-molten state using an extruder provided with a vent device. The imination involved in the present invention may be represented by the following sequential reactions:

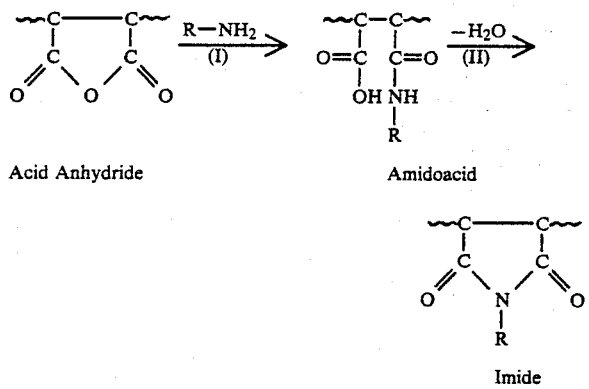

Acid Anhydride        Amidoacid

Imide

The ring-opening reaction represented by the reaction formula (I) and the ring-closing-reaction represented by the reaction formula (II) may be carried out serially in the same reactor or may be carried out separately in different reactors.

The imination reaction may be effected at a temperature of from about 80° C. to about 350° C., preferably from 100° C. to 300° C. The reaction velocity is too late for a commercial scale operation if the temperature is lower than 80° C., whereas the properties of the resultant iminated product is deteriorated due to thermal decomposition if the temperature exceeds 350° C.

Preferable solvents used in the step of iminating the copolymer, in case where the polymer is subjected to imination in the form of solution, include acetone, methyl ethyl ketone, methyl isobutyl ketone, acetophenone, tetrahydrofuran, dimethylformamide, cyclohexanone, toluene, xylene and chlorobenzene, and particularly preferred is methyl ethyl ketone. Preferable non-aqueous solvents used for suspending the copolymer in the imination step include aliphatic hydrocarbons, such as pentane, hexane, heptane, octane, 2-methylpentane, cyclopentane and cyclohexane.

The iminated copolymer modified with a rubber prepared through the process as described above has a high heat distortion temperature, and yet is improved in stability or resistance to water and heat and excellent in mechanical properties, such as impact strength, and in moldability.

The iminated copolymer modified with a rubber provided by this invention may be readily miscible with styrene/acrilonitrile copolymers (SAN resins), ABS resins and MBS resins, and may be blended any of them. Further, the copolymer of the invention may be added with a suitable stabilizer, plasticizer, lubricant, filler or coloring agent.

Next, the Component B is described in detail. The Component B, i.e. the graft-copolymer is obtained by graft-copolymerizing 3 to 80 wt % of a rubber-like polymer with 20 to 97 wt % of a monomer mixture consisting essentially of 40 to 100 wt % of an aromatic vinyl monomer, 0 to 40 wt % of a cyanated vinyl monomer and 0 to 40 wt % of a vinyl monomer copolymerizable with said aromatic vinyl monomer and said cyanated vinyl monomer.

Examples of the rubber-like polymer used in the Component B include a homopolymer of butadiene, copolymers of butadiene with a copolymerizable vinyl monomer, ethylene/propylene/diene copolymer, homopolymers of acrylic esters and copolymers of acrylic esters with copolymerizable vinyl monomers. Preferred examples of the rubber-like polymer include a diene rubber such as polybutadiene, styrene/butadiene random copolymer, styrene/butadiene block copolymer and acrylonitrile/butadiene copolymer; and a polymer of butyl acrylate.

The aromatic vinyl monomer used in the Component B includes styrene series monomers, such as styrene, α-methylstyrene, vinyltoluene, t-butylstyrene and chlorostyrene, and substituted monomers thereof, and particularly preferred are styrene and α-methylstyrene.

Examples of the cynated vinyl monomer are acrylonitrile, methacrylonitrile and α-chloroacrylonitrile, and particularly preferred are acrylonitrile and methacrylonitrile.

Examples of the vinyl monomer copolymerizable with said aromatic vinyl monomer and said cyanated vinyl monomer include acrylic ester monomers, such as methylacrylic esters, ethylacrylic esters and butylacrylic esters; methacrylic ester monomers, such as methylmethacrylic esters and ethylmethacrylic esters; vinyl carboxylic acid monomers, such as acrylic acid and methacrylic acid; acrylic amides; methacrylic amides; acenaphthylene and N-vinyl carbazole. Particularly preferred vinyl monomers, amongst the aforementioned compounds, are methylmethacrylic esters, acrylic acid and methacrylic acid. Most preferred is methylmethacrylic esters.

The graft copolymer used as the Component B may be prepared by graft-copolymerizing 20 to 97 wt % of a monomer mixture consisting essentially of 40 to 100 wt %, preferably 40 to 95 wt % of an aromatic vinyl monomer, 0 to 40 wt %, preferably 5 to 40 wt % of a cyanated vinyl monomer and 0 to 40 wt % of a vinyl monomer copolymerizable with said aromatic vinyl monomer and said cyanated vinyl monomer, in the presence of 3 to 80 wt % of a rubber-like polymer. Graft-copolymerization may be effected according to any of the known techniques including, for example, the suspension polymerization, the heterogenous polymerization in an aqueous medium such as the emulsion polymerization, the bulk or block polymerization, the solution polymerization, and the precipitation polymerization in a non-solvent for the resultant polymer.

The Component C will be described hereinbelow. The Component C, i.e. the polymer is obtained by polymerizing 40 to 100 wt % of an aromatic vinyl monomer, 0 to 40 wt % of a cyanated vinyl monomer and 0 to 40 wt % of a vinyl monomer copolymerizable with said aromatic vinyl monomer and said cyanated vinyl monomer.

The aromatic vinyl monomer used in the Component C includes styrene monomer and monmers of substituted styrene, such as α-methylstyrene, vinyltoluene, t-butylstyrene and chlorostyrene, and particularly preferable being styrene and α-methylstyrene.

Examples of the cyanated vinyl monomer which may be used in the Component C are acrylonitrile, methacrylonitrile and α-chloroacrylonitrile, the preferred being acrylonitrile and methacylonitrile.

Examples of the vinyl monomer copolymerizable with said aromatic vinyl monomer and said cyanated vinyl monomer include acrylic ester monomers, such as methylacrylic esters, ethylacrylic esters and butylacrylic esters; methacrylic ester monomers, such as methylmethacrylic esters and ethylmethacrylic esters; vinyl carboxylic acid monomers, such as acrylic acid and methacrylic acid; acrylic amides; methacrylic amides; acenaphthylene; N-vinyl carbazole, N-alkyl substituted maleimides and maleimides substituted by N-aromatic groups. Most preferred are methylmethacrylic esters.

As mentioned hereinbefore, the thermoplastic resin composition according to this invention comprises the Component A and the Components B and/or C. The method of blending is not critical, and any of the known mixing or blending means may be employed. For example, a Bumbery's mixer, a Henshel mixer, a tumbler mixer, a mixing roller assembly and single and twin screw extruders may be used for this purpose. The Components A and B and/or C may be blended by mixing in molten state, a stepwise mixing method wherein a component to be admixed is melted and keaded with master pellets of another component at respective steps, a method of mixing the solutions of respective components and a method for solution or latex blending. Otherwise, the graft polymerization may be effected in the presence of a thermoplastic copolymer essentially containing the aromatic vinyl to obtain the final composition.

The ratio of the blended Components A, B and C ranges such that 10 to 90 wt %, preferably 50 to 80 wt % of the Component A is blended with 10 to 90 wt %, preferably 20 to 50 wt % of the Component B and 0 to 80 wt %, preferably 0 to 50 wt % of the Component C. The blending ratio is limited because the mixing ratios of the Components B and C should be controlled within the defined range in order to obtain a composition which is improved in moldability and impact strength while retaining the excellent heat resistant and hot water-proof properties of the Component A to well balance the properties of the resultant composition.

According to a preferred embodiment of the invention, the blend resin composition may contain 5 to 25 wt % of the rubber-like polymer in total in the final blend composition irrespective of whether the blend contains the Components B and C or, the Component B only or the Component C only in addition to the Component A. The most preferred embodiment is a blend which contains 5 to 25 wt % of the rubber-like polymer in total and which contains the Components A and B. It is of critical importance that both of the Components A and B include rubber-like polymers. The impact strength of the resulted composition is lowered when either of the Component A or B does not include the rubber-like polymer.

According to the most preferred embodiment, only the Components A and B may be used. However, up to 80 wt % of the Component C may be blended to give a blend composition retaining the excellent properties provided by the Components A and B according to this invention. Therefore, it may be said that this embodiment has the advantage of providing an economical blend containing a large amount of less expensive aromatic vinyl base polymers.

The composition according to the invention may be added with a further additive including a stabilizer, flame retardant, plasticizer, lubricant, fillers such as glass fibers or calcium carbonate powders, coloring agent and ultraviolet ray absorbing agent.

The composition provided by the present invention may be used for various applications in which the thermal stability and high impact strength are required. For example, the resin composition of the invention may be conveniently used for automotive parts, parts of electric or electronic devices, and also used in electric instruments for household uses and in instruments for office uses. Further, since the resin composition is excellent in resistance to hot water, it may be used in kitchen appliances, for containers for foods and drinks, parts for bath room and instruments for medical uses.

EXAMPLES OF THE INVENTION

The present invention will now be described more specifically with reference to some examples thereof. In the following Examples, "parts" and "%", respectively, stand for "part by weight" and "% by weight".

EXAMPLE 1

150 g of styrene and 38 g of a polybutadiene (available from Asahi Chemical Industry Co., Ltd under the Trade Name of "Diene NF55R") cut into small pieces were charged into a 2-liter volume stainless steel autoclave provided with a stirrer. After purging the reaction system with a nitrogen gas, the content in the autoclave was stirred at room temperature for a day to dissolve the rubber in styrene. 180 g of methyl ethyl ketone was added and the content in the autoclave was heated to 80° C., and then a solution prepared by dissolving 64 g of maleic acid anhydride and 0.3 g of benzoyl peroxide in 70 g of methyl ethyl ketone was dividedly added over a period of 6 hours. The content in the autoclave was maintained at 80° C. for additional 2 hours. A portion of the viscous reaction liquid was sampled and tested through gas chromatography to determine unreacted monomers. The degree of polymerization and the content of maleic acid anhydride were calculated from the obtained data. To the aforementioned reaction liquid added were 63.8 g (1.05 times as much as the molar equivalent of the maleic acid anhydride group) of aniline, 2 g of triethylamine and 300 g of methyl ethyl ketone, followed by raising the temperature of the reaction liquid to 140° C. to continue the reaction for 7 hours. After cooling the reaction liquid, methanol was added to the reaction liquid to separate the reaction product as a solid which was filtered and dried. The dried product was analysed by the C-13 NMR analysis to find that the conversion from the acid anhydride to the imino group, namely the percentage imination, was 99%. 0.2 part of an antioxidant, Antioxidant BBM (available from Sumitomo Chemical Co., Ltd.), was added to the iminated copolymer, which was pelletized using a 30 m/mφ screw type extruder provided with a vent device and then molded through a plunger type injection molding machine. The properties of the molded product were tested. The result of polymerization and the properties of the copolymer are, respectively, shown in Table 1 and Table 2.

COMPARATIVE EXAMPLE 1

A copolymer of maleic acid anhydride was prepared under a similar condition except in that the charged amounts of the starting materials were doubled. In detail, 300 g of styrene and 76 g of Diene NF55R were charged into a 2-liter volume autoclave, followed by purging with a nitrogen gas, and then the mixture was stirred for one day to dissolve the same. Then, 360 g of methyl ethyl ketone was added to the reaction mixture, followed by heating to 80° C., and then a solution of 128 g of maleic acid anhydride and 0.6 g of benzoyl peroxide dissolved in 140 g of methyl ethyl ketone was added over a period of 6 hours. The admixture or reaction liquid was stirred for additional 2 hours at 80° C. A half of the reaction liquid was added with methanol, after cooling, to separate a copolymer of maleic acid anhydride.

COMPARATIVE EXAMPLE 2

The remaining half of the reaction liquid prepared in the preceding Comparative Example 1 was used to iminate the copolymer of maleic acid anhydride contained therein.

The reaction liquid was added with 63.8 g of aniline, 2 g of triethylamine and 300 g of methyl ethyl ketone and maintained at 75° C. for 7 hours to proceed the reaction. The resultant iminated copolymer was subjected to processing generally similar to Example 1 and the properties of the product were tested.

COMPARATIVE EXAMPLE 3

Similar operations as in Example 1 were repeated, except in that the rubber, i.e. Diene NF55R, was not used and that the charged quantity of styrene was changed to 188 g.

acid anhydride. The maleic acid anhydride groups contained in the thus obtained rubber-like copolymers were iminated by aniline to prepare iminated copolymers. The compositions charged and the results of the test are shown in Table 3. Other conditions were the same as in Example 1.

EXAMPLE 5

10 parts of a polybutadiene available from Asahi Chemical Industry Co., Ltd. under the Trade Name of "Diene NF-35R" was dissolved in 70 parts of styrene and 5 parts of methyl methacrylate, and then diluted with 70 parts of methyl ethyl ketone. After heating to 80° C., a solution containing 15 parts of maleic acid anhydride, 0.12 part of bonzoyl peroxide and 28 parts of methyl ethyl ketone was dividedly added over a period of 6 hours. The resultant copolymer was iminated under the same condition as in Example 1. The results are shown in Table 3.

TABLE 1

| | Degree of Polymerization (%) | Composition of Maleic Anhydride Base Polymer (%) | | | Degree of Imination (mol %) | | |
|---|---|---|---|---|---|---|---|
| | | Rubber | Styrene | Maleic Acid Anhydride | Acid Anhydride | Amido-acid | Imide |
| Example | 95 | 15.5 | 58.3 | 26.2 | 0 | 1 | 99 |
| Comp. Ex. 1 | 96 | 15.4 | 58.6 | 26.0 | 100 | 0 | 0 |
| Comp. Ex. 2 | 96 | 15.4 | 58.6 | 26.0 | 12 | 69 | 19 |
| Comp. Ex. 3 | 93 | 0 | 73.6 | 26.4 | 0 | 1 | 99 |

TABLE 2

| | Properties of Copolymers | | |
|---|---|---|---|
| | Thermal Stability* (°C.) | Heat Resistance** VSP (°C.) | Impact Strength*** (kg · cm/cm) |
| Example 1 | 350 | 160 | 11 |
| Comp. Ex. 1 | 290 | 150 | 10 |
| Comp. Ex. 2 | 270 | 130 | 12 |
| Comp. Ex. 3 | 354 | 167 | 2.3 |

Note
*Thermal Stability: To be shown by the temperature at which the reduction in weight of the polymer is 1% when determined by thermal gravimetric analysis at a rate of the nitrogen flow of 50 cc/min and at a temperature rasing rate of 10° C./min.
**Heat Resistance: Vicat Softening Point under a loading of 5 kg measured generally in accordance with the ASTM D-1525 Method.
***Impact Strength: Notched Izod Impact Strength measured generally in accordance with the ASTM D-256 Method.

EXAMPLE 2

Acrylonitrile butadiene copolymer (hereinafter referred to as NBR, produced and sold by Japan Synthetic Rubber Co., Ltd. under the Trade Name of "N-230S") was used as the rubber-like polymer in an amount of 15 parts, and mixed with 65 parts of styrene and 20 parts of maleic acid anhydride. The other conditions were the same as in Example 1. The reaction conditions and the obtained results are shown in Table 3.

EXAMPLES 3 and 4

Rubber-like polymers were prepared from two kinds of styrene-butadiene block copolymers (hereinafter referred to as block rubbers) available from Shell Chemical Corp. under the Trade Name of "TR-110" and "TR-406" containing 30% of styrene and 40% of styrene, respectively, combined with styrene and maleic

EXAMPLE 6

A rubber-like copolymer was prepared from 10 parts of styrene-butadiene rubber containing 23.5% of styrene (hereinafter referred to as SBR) available from The Japanese Geon Co., Ltd. under the Trade Name of "Nipol-1502", 65 parts of styrene and 25 parts of maleic acid anhydride. Other conditions were the same as in Example 1.

EXAMPLE 7

A rubber-like copolymer was prepared from 15 parts of a polybutadiene available from Asahi Chemical Industry Co., Ltd. under the Trade Name of "Diene NF-55R" dissolved in 50 parts of styrene and 10 parts of acrylonitrile. Other operation conditions were the same as in Example 5.

EXAMPLE 8

The copolymer of maleic acid anhydride was prepared under the same operation condition as in Example 1, to which added were methylamine in an amount of 1.05 times as much as the molar equivalent of the contained maleic acid anhydride groups, 2 g of triethylamine and 300 g of methyl ethyl ketone and the admixture was reacted at 140° C. for 7 hours.

EXAMPLE 9

The procedure generally in accordance with Example 8 was repeated, except in that n-butylamine was used in place of methylamine.

TABLE 3

| Example | Used Rubber | Charged Composition (part) | | | | Degree of Polymerization (%) | Used Amine | Percentage Imination (mol %) | Properties of Copolymer | | |
|---|---|---|---|---|---|---|---|---|---|---|---|
| | | Rubber | Styrene | Maleic acid anhydride | Others | | | | Thermal Stability (°C.) | Heat Resistance VSP (°C.) | Impact Strength (kg · cm/cm) |
| 2 | NBR | 15 | 65 | 20 | — | 90 | Aniline | 99 | 351 | 142 | 10 |

TABLE 3-continued

| Example | Charged Composition (part) | | | | Degree of Polymerization (%) | Used Amine | Percentage Imination (mol %) | Properties of Copolymer | | |
|---|---|---|---|---|---|---|---|---|---|---|
| | Used Rubber | Rubber | Styrene | Maleic acid anhydride | Others | | | | Thermal Stability (°C.) | Heat Resistance VSP (°C.) | Impact Strength (kg·cm/cm) |

| Example | Used Rubber | Rubber | Styrene | Maleic acid anhydride | Others | Degree of Polymerization (%) | Used Amine | Percentage Imination (mol %) | Thermal Stability (°C.) | Heat Resistance VSP (°C.) | Impact Strength (kg·cm/cm) |
|---|---|---|---|---|---|---|---|---|---|---|---|
| 3 | Block Rubber | 15 | 60 | 25 | — | 95 | Aniline | " | 350 | 161 | 12 |
| 4 | Block Rubber | 20 | 55 | 25 | — | 95 | " | " | 345 | 157 | 16 |
| 5 | Polybutadiene | 10 | 70 | 15 | MMA 5 | 97 | " | " | 348 | 135 | 7 |
| 6 | SBR | 10 | 65 | 25 | — | 96 | " | " | 352 | 163 | 8 |
| 7 | Polybutadiene | 15 | 50 | 25 | AN 10 | 99 | " | " | 353 | 165 | 11 |
| 8 | Polybutadiene | 15 | 60 | 25 | — | 94 | Methylamine | " | 350 | 167 | 10 |
| 9 | Polybutadiene | 15 | 60 | 25 | — | 95 | n-butylamine | " | 354 | 155 | 12 |

The percentage imination (mol % in each of the Examples and Comparative Examples was analysed by the C-13 NMR (nuclear magnetic resonance) method and calculated from the ratio of the areas of the peaks of the spectrum attributable to respective chemical groups or structures. The FX-90 QFT Model available from Japan Electron Optics Laboratory Co., Ltd. was used and operated under the following conditions to conduct the test.

Conditions for Analysis:
Frequency: 22.56 MHz
Lock: Dof DMSO-$d_6$
Data point: 8192
Pukerptn: 10 sec
Pulsewidth: 8$\mu$ sec (30°)
frequency range: 4504 Hz
Solvent: DMSO-$d_6$
Reference: 39.5 ppm of DMSO
Accumlation: 10,000~20,000.

In the appended drawing, the spectra obtained by the C-13 NMR of the polymers prepared in Comparative Examples 1 and 2 and Example 1 are shown for comparison purpose. In the drawing, letters A, B and C represent, respectively, the areas attributed to the following groups:

(A)

(170~172.5 ppm)

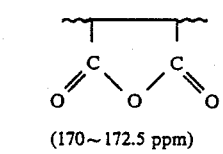

(B)

(172~175 ppm)

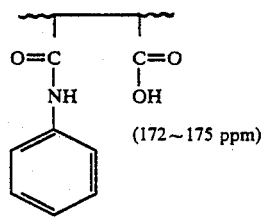

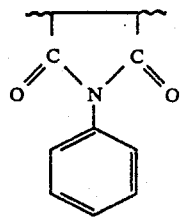

(C)

(177~179 ppm)

EXAMPLES 10 to 28

Experiment (1)

Preparation of Copolymer by Grafting an Aromatic Vinyl/Maleic Anhydride Monomer upon rubber-like Polymer Into an autoclave provided with a stirrer charged were 75 parts of styrene, 100 parts of methyl ethyl ketone and 10 parts of polybutadiene cut into small pieces. After purging the system with a nitrogen gas, the content in the autoclave was stirred at room temperature for one day to dissolve the rubber. After raising the temperature of the content in the autoclave to 80° C., a solution containing 25 parts of maleic acid anhydride and 0.2 part of benzoyl peroxide in 30 parts of methyl ethyl ketone was continuously added over a period of 6 hours. After completion of adding the aforementioned solution, the reaction liquid was maintained at 80° C. for additional 2 hours. A portion of the viscous reaction liquid was sampled to be subjected to gas chromatography to determine the quantities of the unreacted monomers. From the result of the gas chromatography, the degree of polymerization and the content of maleic acid anhydride contained in the polymer were calculated. The remaining reaction liquid was added with 150 parts of methyl ethyl ketone, cooled to the room temperature, and then poured into 800 parts of methanol agitated vigorously to separate a polymer which was filtered and dried to obtain a white powder-form polymer. This experimental run is referred to as Experimental Run No. 1 in Table 4.

As shown in Table 4, similar procedures were repeated except in that the used starting materials and the charged quantities thereof were changed in Experimental Run Nos. 2 to 13 to obtain graft-copolymers shown in Table 4.

TABLE 4

| Experimental Run No. | Rubber-like Polymer (part) | | Monomer (part) | | | | | Degree of Polymerization (%) | Content of MAH in Polymer (%) |
|---|---|---|---|---|---|---|---|---|---|
| | | St | α-MS | MAH | AN | MMA | MA | | |
| 1 | BR | 10 | 75 | — | 25 | — | — | — | 93 | 24.5 |
| 2 | " | 10 | 85 | — | 15 | — | — | — | 90 | 14 |
| 3 | " | 10 | 70 | — | 30 | — | — | — | 95 | 28.5 |
| 4 | " | 10 | 60 | — | 25 | 15 | — | — | 89 | 25 |
| 5 | " | 10 | 60 | — | 25 | — | 15 | — | 90 | 25 |
| 6 | " | 10 | 60 | — | 25 | — | — | 15 | 92 | 24.5 |
| 7 | " | 10 | 60 | 15 | 25 | — | — | — | 92 | 25 |
| 8 | " | 15 | 75 | — | 25 | — | — | — | 93 | 24.5 |
| 9 | " | 25 | 75 | — | 25 | — | — | — | 91 | 25 |
| 10 | STR-1 | 10 | 75 | — | 25 | — | — | — | 93 | 24.5 |
| 11 | STR-2 | 10 | 75 | — | 25 | — | — | — | 94 | 24 |
| 12 | SBR | 10 | 75 | — | 25 | — | — | — | 93 | 24.5 |
| 13 | AR | 10 | 75 | — | 25 | — | — | — | 92 | 25 |

The abridged representations in Table 4 mean the following compounds. Meantime, the same abridged representations will be used in the Tables given below.

St: Styrene
BR: A butadiene rubber available from Asahi Chemical Industry Co., Ltd. under the Trade Name of "Diene NF55R"
STR-1: A 30% styrene-butadiene block copolymer rubber available from Shell Chemical Corp. under the Trade Name of "TR1102"
STR-2: A 40% styrene-butadiene block copolymer rubber available from Asahi Chemical Industry Co., Ltd. under the Trade Name of "Toughprene A"
SBR: A 23.5% styrene-butadiene random copolymer available from The Japanese Geon Co., Ltd. under the Trade Name of "Nipol 1502"
AR: An acrylic rubber available from The Japanese Geon Co., Ltd. under the Trade Name of "Nipol AR32"
α-MS: α-Methylstyrene
AN: Acrylonitrile
MMA: Methylmethacrylate
MA: Methacrylic Acid
MAH: Maleic Acid Anhydride.

Experiment (2)

Preparation of Iminated Copolymer Modified with Rubber (Component A)

30 parts of the copolymer prepared by Experimental Run No. 1 of the Experiment referred to in the preceding Experiment (1) was dissolved in 70 parts of methyl ethyl ketone, to which 7.12 parts of aniline corresponding to 1.02 times as much as the molar equivalent of the maleic acid anhydride group contained in the polymer, and 0.1 parts of triethylamine were added and reacted at 140° C. for 6 hours. The reaction solution was cooled to the room temperature, and poured into 300 parts of vigorously agitated methanol to separate an iminated polymer component A which was filtered and dried. The conversion, i.e. the percentage imination, from the acid anhydride group to the imide group was found to be 99% by the C-13 NMR analysis. Similarly, the copolymers prepared by Experimental Run Nos. 2 to 13 were iminated. The conversion from the acid anhydride group to the imide group in each experimental run was higher than 98%. The thus obtained iminated copolymers modified with rubbers are shown by reference numbers ① to ⑬ to show clear correspondence to the Experimental Run Nos. 1 to 13 in Experiment (1) of Examples 10 to 28.

Experiment (3)

Preparation of Copolymer Modified with Rubber (Component B) Experimental Run No. ⑭

65 parts of a polybutadiene latex (Solid Content: 50%, Average Particle Size: 0.35 micron, Content of Gel: 90%), 1 part of sodium stearate, 0.1 part of sodium formaldehydesulfoxylate, 0.03 part of tetrasodium ethylenediaminetetraacetic acid, 0.003 part of ferrous sulfate and 200 parts of water were heated to 65° C., and added with a mixture containing 35 parts of a monomer mixture composed of 30% of acrylonitrile and 70% of styrene, 0.14 part of t-dodecyl mercaptan and 0.1 part of cumene hydroperoxide continuously over a period of 4 hours. After the completion of adding the aforementioned mixture, the reaction mixture was polymerized at 65° C. for 1.5 hours. The degree of polymerization reached 96%. The resultant latex was added with an antioxidant, and then coagulated by the addition of calcium chloride, followed by washing with water. After drying, a graft polymer of white powder form was obtained, which will be referred to as Experimental Run No. ⑭.

Experimental Run No. ⑮

A graft copolymer was prepared, which will be referred to as Experimental Run No. ⑮, generally similarly to Experimental Run No. ⑭ except in that 65 parts of the polybutadiene latex and 35 parts of a monomer mixture composed of 25% of acrylonitrile, 60% of styrene and 15% of methyl methacrylate were used as the starting materials.

Experimental Run No. ⑯

A graft copolymer was prepared, which will be referred to as Experimental Run No. ⑯, generally similarly to Experimental Run No. ⑭ except in that a mixture composed of 20 parts of a polybutadiene latex, 3 parts of stearic acid, 0.3 part of sodium formaldehyde sulfoxylate, 0.1 part of tetrasodium ethylenediamine tetraacetic acid 0.01 part of ferrous sulfate and 250 parts of water was used and that said mixture was added with 80 parts of a monomer mixture composed of 30% of acrylonitrile and 70% of styrene, 0.32 part of t-dodecyl mercaptan and 0.3 part of cumene hydroperoxide.

Experiment (4)

Preparation of Thermoplastic Copolymer (Component C) Essentially Including Aromatic Vinyl Experimental Run No. (17)

25 parts of acrylonitrile, 75 parts of styrene, 2.5 parts of sodium stearate, 0.6 part of t-dodecyl mercaptan and 250 parts of water were heated to 70° C., and added with 0.05 part of potassium persulfate to initiate polymerization. After 5 hours from the initiation of polymerization, 0.03 part of potassium persulfate was further added and then the temperature of the reaction mixture was raised to 75° C. and maintained at that temperature for 3 hours to complete polymerization. The degree of polymerization reached 97%. The resultant latex was coagulated by the addition of calcium chloride, washed with water and dried to obtain a copolymer of white powder form. This copolymer will be referred to as Experimental Run No. (17).

Experimental Run No. (18):

A copolymer was prepared generally in accordance with the procedure as set forth in Experimental Run No. (17), except in that 15 parts of acrylonitrile, 15 parts of methyl methacrylate and 70 parts of styrene were used as the starting materials. The resultant copolymer will be referred to as Experimental Run No. (18).

Experimental Run No. (19):

A copolymer was prepared similarly to Experimental Run No. (17), except in that 28 parts of acrylonitrile and 72 parts of α-methylstyrene were used as the starting materials. The resultant copolymer will be referred to as Experimental Run No. (19).

Experiment (5)

Blending the Components (A), (B) and (C)

The Components A, B and C were blended in the mixing ratio as set forth in Table 5 to obtain blended compositions. Each of the blended compositions was extruded through a 30 mmφ screw type extruder provided with a vent device to pelletize the blended composition. Each of the Blended compositions was added with 0.2 part of octadecyl-3-(3,5-ditertiarybutyl-4-hydroxyphenyl)propionate as the antioxidant.

The properties of the thus prepared compositions were tested. The results are shown in Table 5. In the Table, encircled numbers are Experimental Run Numbers indicating the preparation runs of the Component A, B or C.

COMPARATIVE EXAPMLE 4

A composition was prepared by blending in accordance with the method set forth in Experiment (5) 50 parts of a copolymer of maleic acid anhydride modified with a rubber but not iminated, i.e. the copolymer prepared in Experimental Run No. 1 of Experiment (1), 20 parts of the copolymer modified with a rubber obtained by Experimental Run No. (14) in Experiment (3) for the preparation of the Component B and 30 parts of a copolymer mainly composed of an aromatic vinyl and obtained by Experimental Run No. (17) in Experiment (4) for the preparation of the Component C. The properties of the composition were tested. The results of the test are shown in Table 5.

COMPARATIVE EXAMPLE 5

A styrene/maleic acid anhydride copolymer was prepared generally similarly to Experiment (1), except in that no polybutadiene was present, and the copolymer was processed similarly to Experiment (2) to obtain an iminated copolymer. The conversion from the acid anhydride group to the imide group was 99%. A blended composition was prepared by blending in accordance with the method set fort in Experiment (5) 50 parts of the aforementioned iminated copolymer, 20 parts of the copolymer modified with a rubber obtained by Experimental Run No. (14) in Experiment (3) for the preparation of the Component B and 30 parts of a copolymer mainly composed of an aromatic vinyl and obtained by Experimental Run No. (17) in Experiment (4) for the preparation of the Component C. The Properties of the blended composition were tested. The test results are shown in Table 5.

TABLE 5

| Example No. | Composition of the Blend (part) (A) | (B) | (C) | Thermal Stability (°C.) | Vicat Softening Point (°C.) | Impact Strength (kg·cm/cm) | Melt Flow Index (g/10 min) | Resistance to Hot Water |
|---|---|---|---|---|---|---|---|---|
| 10 | (1) 50 | (14) 20 | (17) 30 | 324 | 127 | 16 | 2.1 | 0.92 |
| 11 | (2) 50 | (14) 20 | (17) 30 | 332 | 117 | 19 | 2.6 | 0.93 |
| 12 | (3) 50 | (14) 20 | (17) 30 | 329 | 132 | 13 | 1.5 | 0.89 |
| 13 | (4) 50 | (14) 20 | (17) 30 | 325 | 128 | 17 | 2.0 | 0.90 |
| 14 | (5) 50 | (14) 20 | (17) 30 | 321 | 129 | 15 | 2.2 | 0.83 |
| 15 | (6) 50 | (14) 20 | (17) 30 | 324 | 135 | 12 | 1.2 | 0.85 |
| 16 | (7) 50 | (14) 20 | (17) 30 | 317 | 130 | 14 | 1.8 | 0.88 |
| 17 | (8) 50 | (16) 40 | (17) 10 | 320 | 126 | 13 | 2.2 | 0.86 |
| 18 | (9) 50 | (16) 40 | (17) 10 | 325 | 125 | 18 | 1.4 | 0.92 |
| 19 | (10) 50 | (14) 20 | (17) 30 | 323 | 120 | 18 | 1.6 | 0.93 |
| 20 | (11) 50 | (14) 20 | (17) 30 | 322 | 122 | 16 | 1.6 | 0.90 |
| 21 | (12) 50 | (14) 20 | (17) 30 | 328 | 128 | 15 | 1.9 | 0.84 |
| 22 | (13) 50 | (14) 20 | (17) 30 | 325 | 127 | 13 | 2.1 | 0.82 |
| 23 | (1) 50 | (15) 50 | — | 328 | 127 | 14 | 2.4 | 0.82 |
| 24 | (1) 50 | (14) 20 | (19) 30 | 319 | 131 | 14 | 2.3 | 0.87 |
| 25 | (1) 30 | (14) 30 | (19) 40 | 321 | 128 | 19 | 1.0 | 0.92 |
| 26 | (5) 50 | (13) 20 | (18) 30 | 323 | 133 | 17 | 1.9 | 0.81 |
| 27 | (1) 80 | (14) 20 | — | 325 | 138 | 17 | 1.3 | 0.91 |
| 28 | (3) 30 | (16) 70 | — | 333 | 120 | 22 | 2.7 | 0.86 |
| Comp. Ex. 4 | 50 | (14) 20 | (17) 30 | 270 | 123 | 12 | 2.2 | 0.28 |
| Comp. Ex. 5 | 50 | (14) 20 | (17) 30 | 320 | 128 | 7 | 2.5 | 0.66 |

It should be apparent from Table 5 that the composition according to this invention is remarkably improved in thermal stability and resistance to hot water while retaining advantageous moldability and strength.

The properties of the composition were tested according to the following methods.

(1) Thermal Stability: To be shown by the temperature at which the reduction in weight of the composition is 1% when determined by thermal gravimetric analysis at a rate of a nitrogen flow of 50 cc/min and at a temperature raising rate of 10° C./min.

(2) Vicat Softening Point: To be determined generally in accordance with the ASTM D-1525 Method under a loading of 5 kg.

(3) Impact Strength: Notched Izod Impact Strength measured generally in accordance with the ASTM D-256 Method.

(4) Flow Melt Index: Determined generally in accordance with the ASTM D-1238 at a temperature of 250° C. and under a loading of 5 kg.

(5) Resistance to Hot Water: A notched Izod test specimen prepared generally in accordance with the ASTM D-256 is dipped in hot water of 100° C. for 24 hours before it is subjected to the test. The retention rate of the impact strength as compared to the value determined by the test set forth in item (3) above is shown in the Table.

EXAMPLES 29 to 40

Experiment (I)

Preparation of Copolymer Comprising Rubber-like Polymer Grafted with Aromatic Vinyl and Maleic Acid Anhydride Into an autoclave provided with a stirrer, charged were 57 parts of styrene, 100 parts of methyl ethyl ketone and 7 parts of a polybutadiene cut into small pieces. After purging the system with a nitrogen gas, the content in the autoclave was stirred at room temperature for one day to dissolve the rubber. After raising the temperature of the content to 85° C., a solution prepared by dissolving 43 parts of maleic acid anhydride and 0.2 part of benzoyl peroxide in 150 parts of methyl ethyl ketone was continuously added over a period of 6 hours. After the completion of adding the solution, the temperature in the autoclave was maintained at 85° C. for additional 4 hours. A portion of the viscous reaction liquid was sampled and subjected to gas chromatography to determine the quantities of unreacted monomers. The degree of polymerization and the content of maleic acid anhydride in the polymer excluding the weight of the rubber were calculated from the date obtained by the gas chromatography. 150 parts of methyl ethyl ketone were added to the remaining reaction liquid, and the thus diluted reaction liquid was poured into 1500 parts of methanol agitated vigorously to separate a copolymer which was filtered and dried to obtain a white powder. This copolymer will be referred to as Experimental Run No. A.

Genrally in accordance with the procedures as described hereinabove for Experimental Run No. A, grafted copolymers of Experimental Run Nos. B to H were prepared by changing the starting materials and the charged quantities thereof, as shown in Table 6.

TABLE 6

| Experimental Run No. | Rubber-like Polymer (part) | Monomer (part) St | α-MS | MAH | Degree of Polymerization (%) | Content of MAH in the Polymer (%) |
|---|---|---|---|---|---|---|
| A | BR 7 | 57 | — | 43 | 97 | 43 |
| B | BR 7 | 62 | — | 38 | 90 | 40 |
| C | BR 7 | 52 | — | 48 | 93 | 45 |
| D | BR 7 | 45 | 12 | 43 | 95 | 43.5 |
| E | BR 15 | 57 | — | 43 | 96 | 43 |
| F | STR-1 7 | 57 | — | 43 | 97 | 43 |
| G | SBR 7 | 57 | — | 43 | 97 | 42.5 |
| H | AR 7 | 57 | — | 43 | 96 | 43 |

Experiment (II)

Preparation of Iminated Copolymer Modified with Rubber (Component A)

30 parts of the copolymer obtained by the Experimental Run No. A in Experimental Run (I), were dissolved in 70 parts of methyl ethyl ketone in an autoclave, and added with 11.65 parts, corresponding to 1.02 times as much as the molar equivalent of the contained maleic acid anhydride group, followed by reacting at 140° C. for 6 hours. The reaction solution was cooled and then poured into 300 parts of methanol under vigorous agitation to separate an iminated polymer (Component A) which was filtered and dried. The result of C-13 NMR analysis revealed that the conversion from the acid anhydride group to the imide group was approximately 100%. Similarly, the copolymers of Experimental Run Nos. B to H prepared by Experiment (I) were iminated. The conversion from the acid anhydride group to the imide group, in all of these experimental runs, was higher than 99%. The thus obtained iminated copolymers modified with rubbers are shown by reference numerals Ⓐ to Ⓗ to show clear correspondence to the Experimental Run Nos. A to H, in Experiment (I) of Examples 29 to 40.

Experiment (III)

Preparation of Copolymer Modified with Rubber (Component B)

Experimental Run No. I 80 parts of a polybutadiene latex (Solid Content: 50%, Average particle Size: 0.35 micron, Content of Gel: 90%), 1 part of sodium stearate, 0.1 part of sodium formaldehyde sulfoxylate, 0.03 part of tetrasodium ethylenediamine tetraacetic acid, 0.003 part of ferrous sulfate and 200 parts of water were heated to 65° C., and added with a mixture containing 60 parts of a monomer mixture composed of 30% of acrylonitrile and 70% of styrene, 0.3 part of t-dodecyl mercaptan and 0.2 part of cumene hydroperoxide continuously over a period of 4 hours. After the completion of adding the aforementioned mixture, the reaction mixture was polymerized at 65° C. for 2 hours. The degree of polymerization reached 96.5%. The resultant latex was added with an antioxidant, and then coagulated by the addition of calcium chloride, followed by washing with water. After drying, a graft copolymer of white powder form was obtained, which will be referred to as Experimental Run No. I.

Experimental Run No. J

A graft copolymer was prepared generally similarly to Experimental Run No. I except in that 130 parts of the polybutadiene latex and 35 parts of a monomer mixture composed of 25% of acrylonitrile, 60% of styrene and 15% of methylmethacrylic ester were used as the starting materials. The graft copolymer will be referred to as Experimental Run No. J.

Experiment (IV)

Blending the Components A, B and C acid anhydride group to the imide group was approximately 100%. 50 parts of the iminated copolymer (hereinafter referred to as Q), 35 parts of the copolymer modified with a rubber prepared by Experimental Run No. I in Experiment (III) for the preparation of the Component B and 15 parts of the copolymer mainly composed of an aromatic vinyl and prepared by Experimental Run No. 17 in Examples 10 to 28 for the preparation of the Component C were blended in accordance with the procedure as set forth in Experiment (IV). The properties of the resultant composition were tested. The results of test are shown in Table 7.

TABLE 7

| | Composition of the Blend (part) | | | Properties | | | | |
|---|---|---|---|---|---|---|---|---|
| No. | Component A | Component B | Component C | Thermal Stability (°C.) | Vicat Softening Point (°C.) | Impact Strength (kg·cm/cm) | Melt Flow Index (g/10 min) | Resistance to Hot Water |
| Example | | | | | | | | |
| 29 | Ⓐ 50 | Ⓘ 35 | ⑰ 15 | 325 | 138 | 11 | 1.3 | 0.90 |
| 30 | Ⓑ 50 | Ⓘ 35 | ⑰ 15 | 324 | 135 | 12 | 1.5 | 0.92 |
| 31 | Ⓒ 50 | Ⓘ 35 | ⑰ 15 | 317 | 141 | 10 | 0.8 | 0.87 |
| 32 | Ⓓ 50 | Ⓘ 35 | ⑰ 15 | 318 | 142 | 10 | 1.0 | 0.90 |
| 33 | Ⓔ 50 | Ⓘ 35 | ⑰ 15 | 332 | 135 | 14 | 0.7 | 0.88 |
| 34 | Ⓕ 50 | Ⓘ 35 | ⑰ 15 | 325 | 137 | 11 | 1.2 | 0.90 |
| 35 | Ⓖ 50 | Ⓘ 35 | ⑰ 15 | 323 | 138 | 10 | 1.5 | 0.87 |
| 36 | Ⓗ 50 | Ⓘ 35 | ⑰ 15 | 322 | 137 | 10 | 1.5 | 0.83 |
| 37 | Ⓐ 65 | Ⓘ 35 | — | 321 | 146 | 10 | 0.7 | 0.89 |
| 38 | Ⓐ 85 | Ⓙ 20 | — | 328 | 153 | 7 | 1.4 | 0.92 |
| 39 | Ⓐ 30 | Ⓙ 25 | ⑲ 45 | 312 | 133 | 12 | 1.5 | 0.88 |
| 40 | Ⓐ 50 | Ⓘ 50 | — | 330 | 135 | 16 | 0.5 | 0.94 |
| Com. Ex. | | | | | | | | |
| 6 | P 50 | Ⓘ 35 | ⑰ 15 | 268 | 135 | 6 | 1.0 | 0.25 |
| 7 | Q 50 | Ⓘ 35 | ⑰ 15 | 321 | 138 | 4 | 1.6 | 0.80 |

Copolymers prepared by Experimental Run Nos. 17 and 19 as set forth in Examples 10 to 28 were used as the Components C, and blended with the Components A and B in the mixing ratios as set forth in Table 7. Each of the blended compositions was extruded using a 30 mmφ screw type extruder provided with a vent device to be pelletized. Each of the blended compositions was added with 0.2 part of octadecyl-3-(3,5-ditertiarybutyl-4-hydroxyphenyl)-propionate as the antioxidant.

The properties of the thus prepared compositions were tested. The test results are shown in Table 7. In the Table, encircled numbers are Run Numers indicating the preparation runs of the Component A, B or C.

COMPARATIVE EXAMPLE 6

A composition was prepared by blending 50 parts of a copolymer (hereinafter referred to as P) of maleic acid anhydride modified with a rubber but not iminated, i.e. the copolymer prepared in Experimental Run No. A in Experiment (I), 35 parts of the copolymer modified with a rubber obtained by Experimental Run No. I in Experiment (III) for the preparation of the Component B and 15 parts of the copolymer mainly composed of an aromatic vinyl and obtained by Experimental Run No. 17 in Experiment (4) of Examples 10 to 28, in accordance with the procedure as set forth in Experiment (IV). The properties of the resultant composition were tested. The test results are shown in Table 7.

COMPARATIVE EXAMPLE 7

A styrene/maleic acid anhydride copolymer was prepared similarly to Experiment (I), except in that no polybutadiene was present, and the thus prepared copolymer was iminated similarly to Experiment (II) to obtain an iminated copolymer. The conversion from the acid anhydride group to the imide group was approximately 100%. 50 parts of the iminated copolymer (hereinafter referred to as Q), 35 parts of the copolymer modified with a rubber prepared by Experimental Run No. I in Experiment (III) for the preparation of the Component B and 15 parts of the copolymer mainly composed of an aromatic vinyl and prepared by Experimental Run No. 17 in Examples 10 to 28 for the preparation of the Component C were blended in accordance with the procedure as set forth in Experiment (IV). The properties of the resultant composition were tested. The results of test are shown in Table 7.

It should be clear from Table 7 that the composition according to this invention is remarkably improved in impact strength, thermal stability and resistance to hot water while retaining advantageous moldability inherent to the thermoplastic resin which is not modified with a rubber.

Although the present invention has been described with reference to specific examples thereof, it should be understood that various modifications and variations may be easily made by those skilled in the art without departing from the spirit of the invention. It is, thus, intended to include all such modifications and variations within the wide scope of the invention as defined in the appended claims.

What is claimed is:

1. A process for producing an iminated copolymer which comprises reacting in the presence of a tertiary amine at a temperature of 80° to 350° a nitrogen compound selected from the group consisting of ammonia and a primary amine with a graft copolymerization product obtained by graft-copolymerizing 3 to 40 wt % of a rubber-like polymer, the content of gel in said rubber-like polymer being not more than 5% by weight and the glass transition temperature thereof being below − (minus) 20° C., with 60 to 97 wt % of a monomer mixture consisting essentially of 50 to 95 wt % of an aromatic vinyl monomer, 5 to 50 wt % of an unsaturated dicarboxylic acid anhydride and 0 to 30 wt % of a vinyl monomer copolymerizable with said aromatic vinyl monomer and said unsaturated dicarboxylic acid anhydride, the molar ratio of the nitrogen compound to the unsaturated dicarboxylic acid anhydride contained in said graft copolymerization product being at least 1.

2. A process for producing an iminated copolymer according to claim 1, wherein the amount of said tertiary amine is 0.001 to 0.5 times the molar equivalent of the dicarboxylic acid anhydride group in the copolymer.

3. A process for producing an iminated copolymer according to claim 1, wherein said tertiary amine is triethylamine.

4. A process for producing an iminated copolymer according to claim 1, wherein said primary amine is selected from the group consisting of alkylamines and aromatic amines.

5. A process for producing an iminated copolymer according to claim 4, wherein said alkylamine is methylamine.

6. A process for producing an iminated copolymer according to claim 4, wherein said aromatic amine is aniline.

7. A process for producing an iminated copolymer according to claim 4, wherein said primary amine is a mixture of methylamine and aniline.

8. A process for producing an iminated copolymer according to claim 1, wherein said rubber-like polymer is selected from the group consisting of polybutadiene, styrene butadiene random copolymer, styrene/butadiene block copolymer, acrylonitrile/butadiene copolymer, butyl acrylate copolymer and ethylene/propylene/diene copolymer.

9. A process for producing an iminated copolymer according to claim 1, wherein said aromatic vinyl monomer is selected from the group consisting of styrene and substituted styrene.

10. A process for producing an iminated copolymer according to claim 1, wherein said unsaturated dicarboxylic acid anhydride is maleic acid anhydride.

11. A process for producing an iminated copolymer according to claim 1, wherein said copolymerization vinyl monomer is selected from the group consisting of acrylonitrile, methylmethacrylic esters and methacrylic acid.

12. A process according to claim 1, in which said ratio is 1 to 1.3.

* * * * *